United States Patent
Kim

(10) Patent No.: US 6,229,866 B1
(45) Date of Patent: *May 8, 2001

(54) APPARATUS FOR DETECTING ERRORS IN ASYNCHRONOUS DATA RECEIVER AND TRANSMITTER

(75) Inventor: Gye Su Kim, Daekukwangyeok-si (KR)

(73) Assignee: LG Semicon Co., Ltd., Chungcheongbuk-Do (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/926,028

(22) Filed: Sep. 9, 1997

(30) Foreign Application Priority Data

Mar. 12, 1997 (KR) .................................................. 97/8320

(51) Int. Cl.[7] ..................................................... H04L 23/00
(52) U.S. Cl. .......................................... 375/377; 714/758
(58) Field of Search .................................. 375/355, 359, 375/377, 226, 371, 372, 360, 340, 369, 326; 371/37.01, 37.7; 341/122, 123; 714/758, 752

(56) References Cited

U.S. PATENT DOCUMENTS

| | | | |
|---|---|---|---|
| 4,736,189 | * 4/1988 | Katsumata et al. | 340/347 |
| 5,056,115 | * 10/1991 | Meuriche . | |
| 5,488,639 | * 1/1996 | MacWilliams et al. | 375/355 |
| 5,530,483 | * 6/1996 | Cooper et al. | 348/518 |
| 5,539,298 | * 7/1996 | Perkins et al. | 320/21 |
| 5,598,429 | * 1/1997 | Marshall | 375/210 |
| 5,608,514 | * 3/1997 | Stann et al. | 356/5.09 |
| 5,815,101 | * 9/1998 | Fonte | 341/123 |

OTHER PUBLICATIONS

National Semiconductor Co., PC 16550D Data Book (Jun. 1995).

* cited by examiner

*Primary Examiner*—Chi Pham
*Assistant Examiner*—Jean B. Corrielus
(74) *Attorney, Agent, or Firm*—Morgan, Lewis & Bockius, LLP

(57) ABSTRACT

An apparatus for detecting errors in an asynchronous data receiver and transmitter include a first sample block for sampling a received serial data bit, a first storing part for storing a first value of the serial data bit sampled by the first sample block for a predetermined time, a second sample block for sampling the received serial data bit, a second storing part for storing a second value of the serial data bit sampled by the second sample block for a predetermined time, and a comparing part for receiving and comparing the first value and the second value of the serial data bit stored in the first and second storing parts and outputting an error signal if the first value and the second value are not identical.

4 Claims, 2 Drawing Sheets

APPARATUS FOR DETECTING ERRORS IN ASYNCHRONOUS DATA RECEIVER AND TRANSMITTER

This application claims the benefit of Korean Application Number 8320/1997 filed on Mar. 12, 1997, which is hereby incorporated by reference.

BACKGROUND OF THE INVENTION

1. Field of the Invention

The present invention relates to an asynchronous data receiver and transmitter, and more particularly, to an apparatus for detecting errors in an asynchronous data receiver and transmitter.

2. Discussion of the Related Art

Most of modules for general system construction employ a central processing unit (CPU) for processing data. There are two methods for transmitting and receiving data between modules. One of the methods is the synchronous method in which data processing clocks are synchronized with data receiving and transmission operations between modules. The other method is the asynchronous method in which data is processed asynchronously.

In the synchronous method, many additional circuits are required in the system in order to provide suitable synchronization between the modules. This decreases the data processing rate of the system.

In contrast, in the asynchronous method, each of the reading module and the writing module employs an input/output buffer. Thus, a good data-processing rate and economical cost can be achieved.

A conventional apparatus for detecting errors in an asynchronous data receiver and transmitter will be described with reference to the accompanying drawings.

FIG. 1 is a block diagram showing a conventional apparatus for detecting errors in an universal asynchronous receiver and transmitter (UART), and FIG. 2 shows one frame of a conventional UART.

Referring to FIG. 1, an apparatus for detecting errors in an UART 10 includes a sample block 11 for sampling values of serial data received by the UART 10, a parity check block 12 for checking the values of the data sampled by the sample block 11 and comparing the values with parity to detect errors, a line control resister 13 for designating the length and the value of a parity bit to be detected by the sample block 11 and the parity check block 12, and a buffer register 14 for storing the data checked by the parity check block 12.

For example, the operation of the UART having the aforementioned structure is determined as an error if the number of '1' of a data parity is even. The operation is deemed to be normal if the number of '1' of a data parity is odd.

In the error detecting apparatus of an UART, a parity desired to be detected is designated using the line control register 13. The parity of the serial data received by using the designated parity is calculated by one bit in the sample block 11.

If the parity bit and the value calculated in the sample block 11 are not identical when the value calculated in the sample block 11 is compared with a parity bit next received in the parity check block 12, a parity error is detected. For example, if an even parity detection is designated in the line control register 13 and a received serial data is 00101000, the parity bit is '0'. If, compared with a parity bit received next, this value is not identical with the parity bit, a message of parity error is recorded in a line status register (not shown) and interruption of the operation is requested.

FIG. 2 shows an UART frame including a start bit, a data bit, a parity bit, and a stop bit. When the UART frame receives a serial data signal, the sample block 11 samples serial data values by bits. After required data is stored in the buffer register 14 for a predetermined time, the data is transmitted or received.

The conventional apparatus for detecting errors in an UART is not capable of precisely detecting errors. As a result, the UART receives incorrect data. For example, if a data of 00101010 is sent by a remote system such that a local system has sampled a data of 00110010, a parity error will not be generated. As a result, a wrong data is transmitted and received.

SUMMERY OF THE INVENTION

Accordingly, the present invention is directed to an apparatus for detecting errors in an asynchronous data receiver and transmitter that substantially obviates one or more of problems due to limitations and disadvantages of the related art.

An object of the present invention is to provide an apparatus for detecting errors in an asynchronous data receiver and transmitter suitable for precisely and rapidly detecting errors when receiving and transmitting data.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the apparatus for detecting errors in an asynchronous data receiver and transmitter includes a first sample block for first sampling received data, a first storing part for storing a value of the data sampled by the first sample block for a predetermined time, a second sample block for secondly sampling the received data, a second storing part for a value of the data sampled by the second sample block for a predetermined time, and a comparing part for receiving and comparing the values of the data stored in the first and second storing parts and outputting an error signal if the values of the data are not identical.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
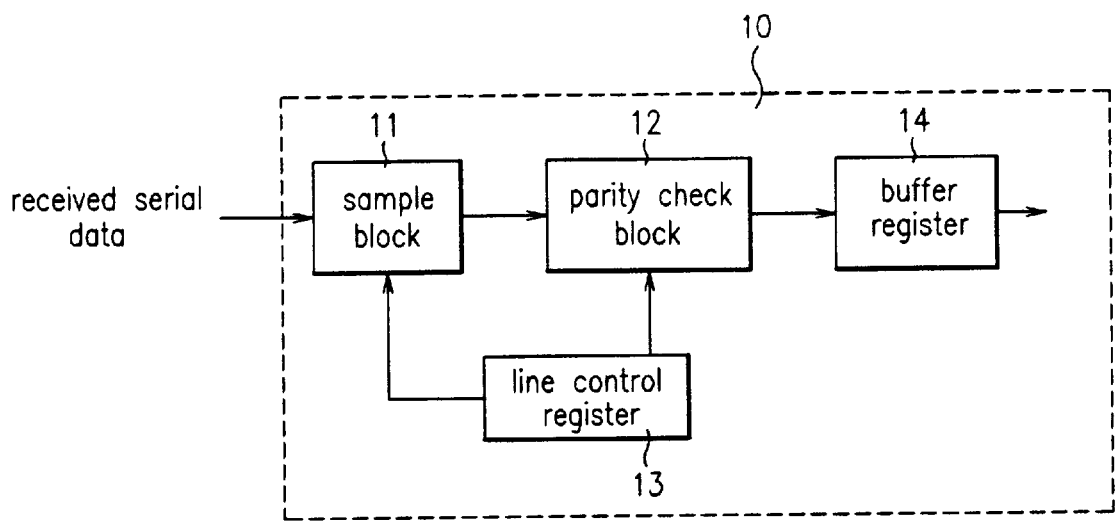
FIG. 1 is a block diagram showing a conventional apparatus for detecting errors in an UART.
Figure 2:
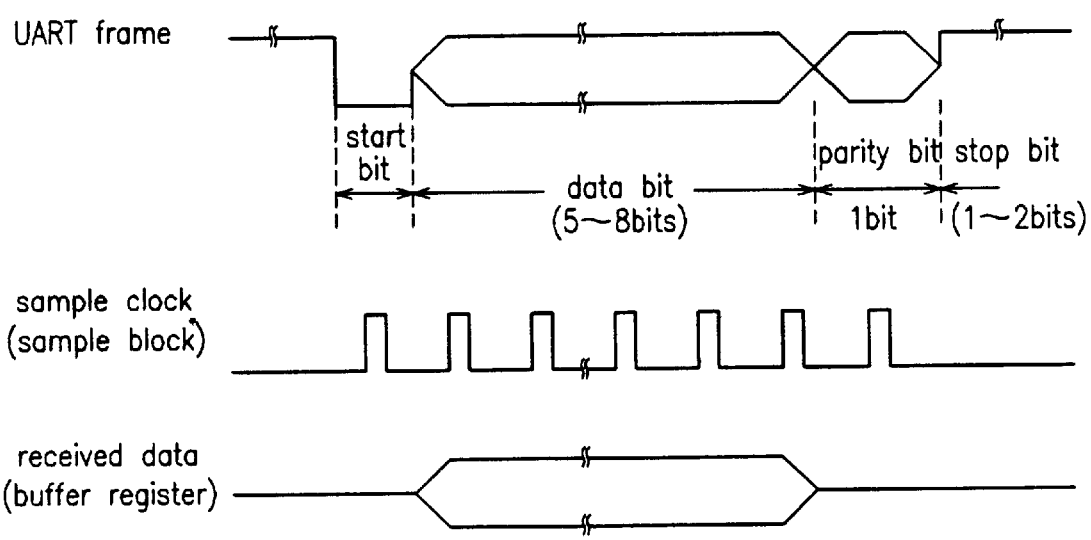
FIG. 2 is a frame of a conventional UART.
Figure 3:
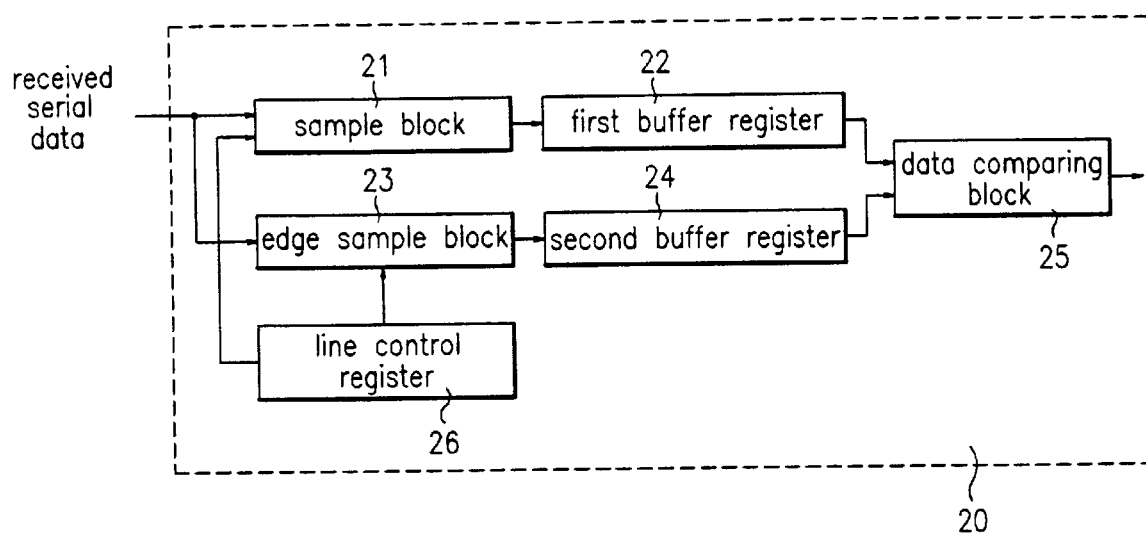
FIG. 3 is a block diagram showing an apparatus for detecting errors in an UART in accordance with the present invention.
Figure 4:
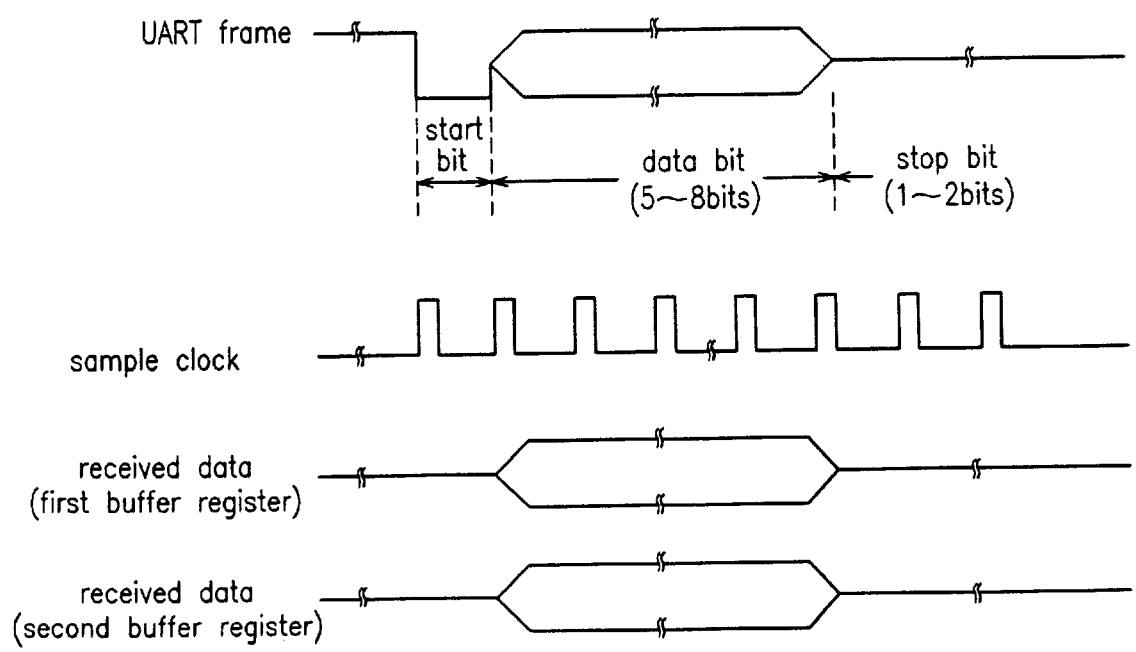
FIG. 4 is a frame of an UART in accordance with the present invention.

FIG. 3 is a block diagram showing an apparatus for detecting errors in an UART according to the invention, and FIG. 4 is a frame of an UART according to the invention.

Referring to FIG. 3, the apparatus for detecting errors in an UART 20 includes a sample block 21 for sampling a center portion of a serial data received by the UART 20, and a first buffer register 22 for temporarily storing the value of the data sampled by the sample block 21. The apparatus also includes an edge sample block 23 for sampling an edge portion of the received serial data, and a second buffer register 24 for temporarily storing a value of the data sampled by the edge sample block 23. The apparatus further includes a data comparing block 25 for comparing the values of the data stored in the first and second buffer registers 22 and 24, and a line control register 26 for determining lengths of the data detected by the sample block 21 and the edge sample block 23.

In the apparatus for detecting errors in the UART according to the present invention, the line control register 26 is used to determine whether to perform an error check in a received serial data. At this time, the line control register 26 is selected using a parity enable bit. Since the error check function is determined by the line control register 26, a serial data frame of the UART is sampled by a bit in the sample block 21 and the edge sample block 23. The two values of the data sampled in the sample block 21 and the edge sample block 23, respectively, are compared with each other by the comparing block 25. If the two values are not identical, a data error is detected.

Referring to FIG. 4, a frame of the UART includes a start bit, a data bit, and a stop bit. Using a sample clock having a predetermined period, a data bit is sampled twice in the sample block 21 and in the edge sample block 23, thus resulting in two sampled values. Then, the two sampled values are compared with each other to determine whether or not there is an error. At this time, the data bit is about 5 bits 8–8 bits and the stop bit is about 1 bit–2 bits.

The apparatus for detecting errors in the UART of the present invention has the following advantages. An edge portion and a center portion of a bit of a received serial data are sampled. Then, the values of the two sampled portions are compared with each other to detect an error. As a result, errors can be precisely detected. In addition, data errors can be rapidly detected since an extra parity bit is not used.

It will be apparent to those skilled in the art that various modifications and variations can be made in the apparatus for detecting errors in an asynchronous data receiver and transmitter of the present invention without departing from the spirit or scope of the invention. Thus, it is intended that the present invention cover the modifications and variations of this invention provided they come within the scope of the appended claims and their equivalents.

What is claimed is:

1. An apparatus for detecting errors in an asynchronous data receiver and transmitter, comprising:

a first sample block for sampling a center portion of a bit of a received serial data which is asynchronous and digital;

a first storing part for storing a first value of the serial data bit sampled by the first sample block for a period of time;

a second sample block for sampling an edge portion of the received serial data bit, wherein the first sample block and the second sample block sample the received serial data bit at a same rate;

a second storing part for storing a second value of the serial data bit sampled by the second sample block for the period of time, wherein the first value and the second value of the serial data bit are always identical when no error is present; and a comparing part for receiving and comparing the first value and the second value of the serial data bit stored in the first and second storing parts and outputting an error signal if the first value and the second value are not identical.

2. The apparatus as claimed in claim 1, further comprising a controlling part for determining whether or not the first and second sample blocks should sample the received serial data bit.

3. The apparatus as claimed in claim 1, wherein the first storing part includes a buffer register.

4. The apparatus as claimed in claim 1, wherein the second storing part includes a buffer register.

* * * * *